(12) United States Patent
Gui et al.

(10) Patent No.: US 11,474,299 B2
(45) Date of Patent: Oct. 18, 2022

(54) WAVELENGTH-DIVISION MULTIPLEXING DEVICES WITH MODIFIED ANGLES OF INCIDENCE

(71) Applicant: ALLIANCE FIBER OPTIC PRODUCTS, INC., Sunnyvale, CA (US)

(72) Inventors: Dong Gui, San Jose, CA (US); Yao Li, Newark, CA (US); Shudong Xiao, Fremont, CA (US); Andy Fenglei Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 17/158,688

(22) Filed: Jan. 26, 2021

(65) Prior Publication Data

US 2021/0149117 A1    May 20, 2021

Related U.S. Application Data

(63) Continuation of application No. PCT/US2019/042740, filed on Jul. 22, 2019.

(60) Provisional application No. 62/712,698, filed on Jul. 31, 2018.

(51) Int. Cl.
     *G02B 6/293*      (2006.01)
     *G02B 6/35*      (2006.01)

(52) U.S. Cl.
     CPC ....... *G02B 6/29367* (2013.01); *G02B 6/2938* (2013.01); *G02B 6/29311* (2013.01); *G02B 6/3514* (2013.01)

(58) Field of Classification Search
None
See application file for complete search history.

(56) References Cited

U.S. PATENT DOCUMENTS

| | | | |
|---|---|---|---|
| 4,622,663 A | 11/1986 | Ishikawa et al. | |
| 5,737,104 A | 4/1998 | Lee et al. | |
| 5,786,915 A | 7/1998 | Scobey | |
| 5,889,899 A | 3/1999 | Henry et al. | |
| 6,008,920 A * | 12/1999 | Hendrix | G02B 6/2938 |
| | | | 359/633 |
| 6,167,171 A | 12/2000 | Grasis et al. | |
| 7,092,587 B1 * | 8/2006 | Denis | G02B 6/29365 |
| | | | 385/129 |

(Continued)

FOREIGN PATENT DOCUMENTS

KR    10-2014-0126635 A    10/2014

OTHER PUBLICATIONS

International Search Report and Written Opinion of the International Searching Authority; PCT/US2019/042740 dated Nov. 8, 2019; 11 pages; European Patent Office.

(Continued)

*Primary Examiner* — Chad H Smith
(74) *Attorney, Agent, or Firm* — Adam R. Weeks

(57) ABSTRACT

Disclosed herein are wavelength-division multiplexing devices using different angles of incidence (AOIs) at the WDM filters to provide for variable placement and orientation of WDM filters and channel ports, thereby decreasing the device footprint and allowing for shorter overall optical signal paths to increase signal performance and reliability. Also disclosed are stacked WDM filters for increased signal isolation.

14 Claims, 11 Drawing Sheets

(56) References Cited

U.S. PATENT DOCUMENTS

| | | |
|---|---|---|
| 7,787,731 B2 | 8/2010 | Bookbinder et al. |
| 7,843,644 B1 | 11/2010 | Wang et al. |
| 8,908,281 B2 | 12/2014 | Fu |
| 9,401,773 B1 | 7/2016 | Gui et al. |
| 9,551,833 B1 | 1/2017 | Li et al. |
| 9,590,759 B1 | 3/2017 | Peng et al. |
| 2008/0166094 A1 | 7/2008 | Bookbinder et al. |
| 2009/0103866 A1 | 4/2009 | Morris et al. |
| 2009/0169163 A1 | 7/2009 | Abbott et al. |
| 2010/0329678 A1 | 12/2010 | Wang et al. |
| 2014/0355987 A1 | 12/2014 | Zhu et al. |
| 2016/0187585 A1 | 6/2016 | Yue |
| 2017/0261691 A1 | 9/2017 | Yue |
| 2018/0059328 A1 | 3/2018 | Shi |
| 2019/0067359 A1 | 2/2019 | Matsumoto |

OTHER PUBLICATIONS

Wang et al., "Compact CWDM: a low-cost high-performance packaging platform", Proceedings of Spie Medical Imaging, vol. 5729, Mar. 25, 2005, p. 285.

W. Shi et al., "Ultra-compact, flat-top demultiplexer using anti-reflection contra-directional couplers for CWDM network on silicon", OSA, 2013 (Year: 2013).

\* cited by examiner

WAVELENGTH-DIVISION MULTIPLEXING DEVICES WITH MODIFIED ANGLES OF INCIDENCE

PRIORITY APPLICATION

This application is a continuation of International Application No. PCT/US19/42740, filed on Jul. 22, 2019, which claims the benefit of priority to U.S. Application No. 62/712,698, filed on Jul. 31, 2018, both applications being incorporated herein by reference.

BACKGROUND

The disclosure relates to wavelength-division multiplexing and demultiplexing, and more particularly, to wavelength-division multiplexing devices utilizing modified angles of incidence to decrease the footprint size of a WDM device and increase signal quality. The disclosure also relates to the use of stacked WDM filters in wavelength-division multiplexing devices.

Wavelength-division multiplexing (WDM) is a technology that multiplexes (e.g., adds) a number of distinct wavelengths of light onto a single optical fiber and demultiplexes (e.g., divides) a number of distinct wavelengths of light from a single optical fiber, thereby increasing information capacity and enabling bi-directional flow of signals. Multiple optical signals are multiplexed with different wavelengths of light combined by a multiplexer at a transmitter, directed to a single fiber for transmission of the signal, and split by a demultiplexer to designated channels at a receiver. By combining multiple channels of light into a single channel, WDM devices and associated devices can be used as components in an optical network, such as a passive optical network (PON).

FIG. 1 is a diagram illustrating a WDM device 100. The WDM device 100 includes a common port 102, a plurality of channel ports 104(1)-104(7) (may be referred to generally as a channel port 104), and a plurality of WDM filters 106(1)-106(7) (may be referred to generally as a WDM filter 106). The common port 102 is configured for optical communication of a multiplexed signal including a plurality of demultiplexed signals. Each of the channel ports 104 is configured for optical communication of one of the plurality of demultiplexed signals. The WDM filters 106 are configured for routing demultiplexed signals of a multiplexed signal between the common port 102 and the channel ports 104 along an optical signal path 108. In other words, the optical signal path comprises the multiplexed signal which includes one or more demultiplexed signals. The channel ports 104 are divided into a first channel array 110(1) and a second channel array 110(2). The WDM filters 106 are divided into a first WDM filter array 112(1) aligned along a first axis A1, and a second WDM filter array 112(2) aligned along a second axis B1.

In order to properly filter and route the demultiplexed signals, each WDM filter 106 requires that the optical signal path 108 intersects the WDM filter 106 within a maximum angle of incidence (AOI) of the WDM filter 106. The AOI is the angle that the signal makes with a perpendicular to a surface of the filter at the point of incidence. For example, the common port 102 transmits a multiplexed signal to the first WDM filter 106(1) along a first portion 114(1) of the optical signal path 108 which intersects the first WDM filter 106(1) at a first AOI α1(1). A portion of the multiplexed signal is reflected by the first WDM filter 106(1) and transmits along a second portion 114(2) of the optical signal path 108 which intersects the second WDM filter 106(2) at a second AOI α1(2). This process of passing and reflecting signals is repeated for the remaining WDM filters 106.

Different filters may have different maximum AOIs. For example, multiband filters (e.g., for XGS signals, NG-PON2 signals, etc.) may have smaller maximum AOIs than single passband filters. WDM filters 106 with smaller maximum AOIs can have high isolation, wider pass bands, etc. WDM filters 106 that have smaller maximum AOI also require larger distances X1 between the first WDM set 112(1) (and common port 102) and the second WDM set 112(2) in order to accommodate the smaller maximum AOI. In addition, the positioning and distance X1 between the first WDM set 112(1) (and common port 102) and the second WDM set 112(2) is limited because the WDM filters 106 must maintain a minimum relative distance Y1 from each other. For example, the WDM filters 106 in the first WDM set 112(1) cannot be moved closer to each other than their widths allow. Accordingly, the minimum distance X1 between the first WDM set 112(1) (and common port 102) and the second WDM set 112(2) is determined by the distance Y1 between adjacent WDM filters 106 (e.g., due to the size of the filters if they are directly adjacent to each other) and by the smallest maximum AOI for a single WDM filter 106, even if all of the other WDM filters 106 allow for much larger AOIs. This can result in a WDM device 100 with a relatively large footprint. Further, the larger the distance X1 between the first WDM set 112(1) (and common port 102) and the second WDM set 112(2), the longer the portions of the optical signal path 108 between filters (e.g., D1, D2). A longer optical signal path 108 may result in larger signal loss and decreased performance.

FIG. 2 is a diagram of a WDM filter 200 illustrating signal leakage. A WDM filter 200 has a first surface 202A (also called the filtering surface) which includes an optical filter and a second surface 202B opposite the first surface 202A. As used herein, the term "filtering surface" is a surface of a WDM filter that includes an optical filter. When a multiplexed signal intersects with the filtering surface 202A of the WDM filter 200 along an input optical signal path 204, any demultiplexed signal within the passband transmits through the WDM filter 200 along a transmit optical signal path 206 on a transmission side 208 of the WDM filter 200. The remaining portion of the multiplexed signal outside of the passband is reflected by the WDM filter 200 along a reflected optical signal path 210 on the reflection side 212 of the WDM filter 200. In some instances, small amounts of the signal outside of the passband may still transmit through the WDM filter 200. This is measured by the power density ratio, also called isolation. Certain applications may require greater isolation and less leakage. In particular, WDM filters 200 with smaller maximum AOIs may require greater isolation and less leakage.

No admission is made that any reference cited herein constitutes prior art. Applicant expressly reserves the right to challenge the accuracy and pertinency of any cited documents.

SUMMARY

Disclosed herein are wavelength-division multiplexing devices. In particular, disclosed is a wavelength-division multiplexing (WDM) device using different angles of incidence (AOIs) from variable placement and orientation of WDM filters and channel ports. Also disclosed are stacked WDM filters. One embodiment of the disclosure relates to a wavelength-division multiplexing (WDM) device that includes a first common port, a first channel port, a second channel port, a first WDM filter, a second WDM filter, and an optical signal path. The first common port is configured for optical communication of a first multiplexed signal comprising a first demultiplexed signal and a second demultiplexed signal. The first channel port is configured for optical communication of the first demultiplexed signal. The second channel port is configured for optical communication of the second demultiplexed signal. The first WDM filter has a first passband and a first maximum angle of incidence (AOI). The first WDM filter is configured to pass the first demultiplexed signal of the first multiplexed signal at a first AOI less than the first maximum AOI and reflect the second demultiplexed signal of the first multiplexed signal. The second WDM filter has a second passband and a second maximum AOI. The second WDM filter is configured to pass the second demultiplexed signal of the first multiplexed signal at a second AOI less than the second maximum AOI. The second AOI at the second WDM filter is different than the first AOI at the first WDM filter. The optical signal path comprises the first common port, the first WDM filter, the second WDM filter, and the second channel port.

An additional embodiment discloses a method of using a WDM device that includes transmitting from a common collimator a multiplexed signal comprising a first demultiplexed signal and a second demultiplexed signal. The method further includes passing the first demultiplexed signal through a first passband of a first WDM filter at a first angle of incidence (AOI) to a first channel collimator. The method further includes reflecting the second demultiplexed signal from the first WDM filter to a second WDM filter. The method further includes passing the second demultiplexed signal through a second passband of the second WDM filter at a second AOI to a second channel collimator, the second AOI at the second WDM filter being different than the first AOI at the first WDM filter.

An additional embodiment discloses a WDM device that comprises a first common port, a first channel port, a first primary WDM filter, a first secondary WDM filter, and an optical signal path. The first common port is configured for optical communication of a first multiplexed signal comprising a first demultiplexed signal and a second demultiplexed signal. The first channel port is configured for optical communication of the first demultiplexed signal. The first primary WDM filter has a first passband configured to pass the first demultiplexed signal of the first multiplexed signal and reflect the second demultiplexed signal of the first multiplexed signal. The first secondary WDM filter has the first passband configured to further isolate the first demultiplexed signal transmitted through the first primary WDM filter. The optical signal path comprises the first common port, the first primary WDM filter, the first secondary WDM filter, and the first channel port. The first secondary WDM filter is positioned in the optical signal path between the first primary WDM filter and the first channel port.

An additional embodiment discloses a method of isolating a wavelength-division multiplexing (WDM) signal. The method includes transmitting from a first common collimator a first multiplexed signal comprising a demultiplexed signal. The method further includes passing the demultiplexed signal through a first passband of a primary WDM filter. The method further includes passing the demultiplexed signal through the first passband of a secondary WDM filter to a channel collimator.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
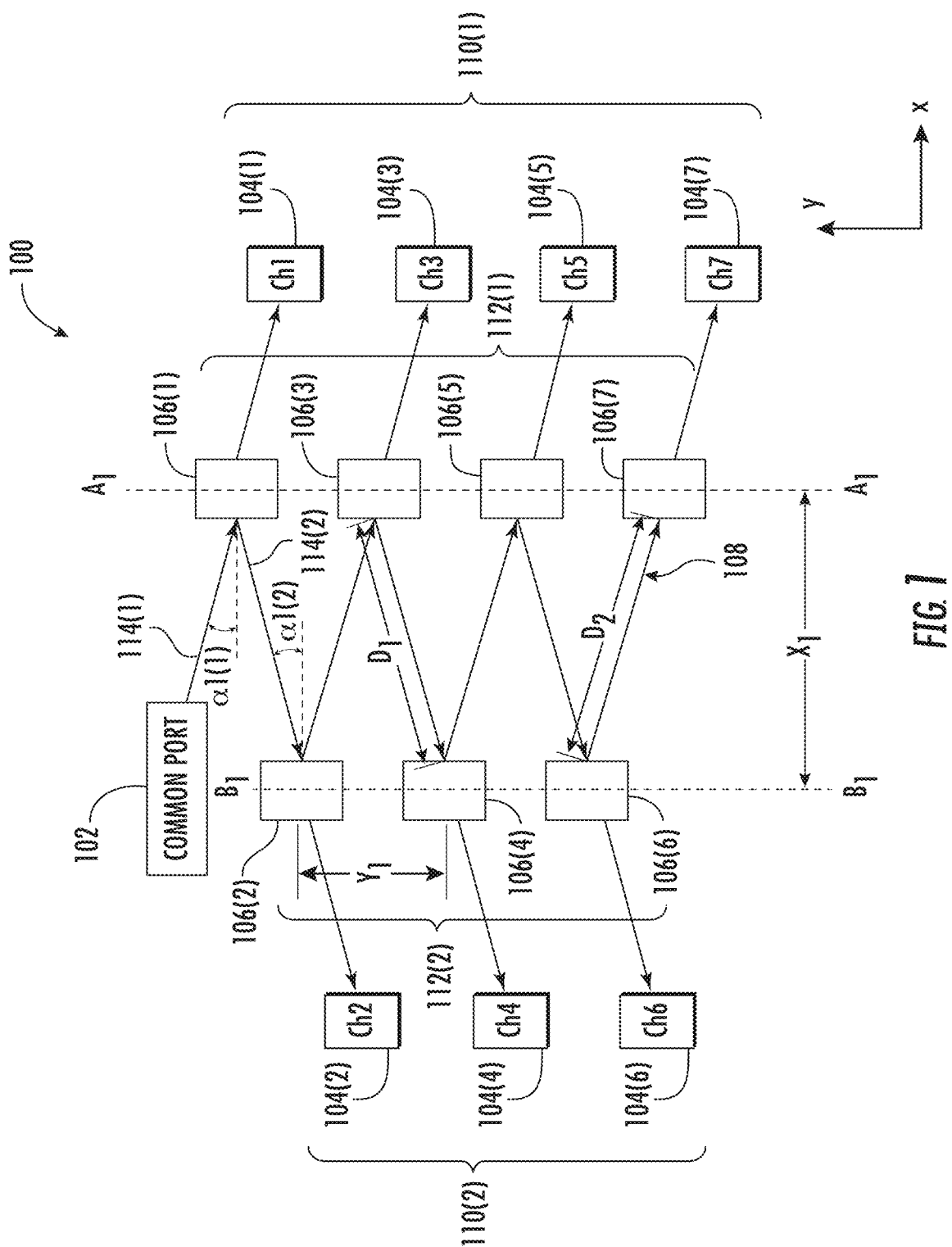
FIG. 1 is a diagram illustrating a wavelength-division multiplexing (WDM) device.
Figure 2:
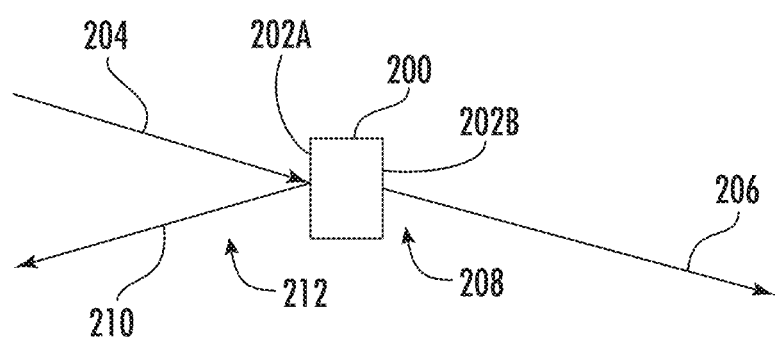
FIG. 2 is a diagram of a WDM filter illustrating signal leakage.

Reference will now be made in detail to the present preferred embodiments, examples of which are illustrated in the accompanying drawings. Whenever possible, the same reference numerals will be used throughout the drawings to refer to the same or like parts.

Terms such as "left," "right," "top," "bottom," "front," "back," "horizontal," "parallel," "perpendicular," "vertical," "lateral," "coplanar," and similar terms are used for convenience of describing the attached figures and are not intended to limit this description. For example, terms such as "left side" and "right side" are used with specific reference to the drawings as illustrated and the embodiments may be in other orientations in use. Further, as used herein, terms such as "horizontal," "parallel," "perpendicular," "vertical," "lateral," etc., include slight variations that may be present in working embodiments.

As used herein, the terms "optical communication," "in optical communication," and the like mean that two elements are arranged such that optical signals are passively or actively transmittable therebetween via a medium, such as, but not limited to, an optical fiber, connectors, free space, index-matching structure or gel, reflective surface or surfaces, filters, or other light directing or transmitting means.

As used herein, the term "port" means an interface for actively or passively passing (e.g., receiving, transmitting, or both receiving and transmitting) optical signals. A port may include, by way of non-limiting examples, one or more collimators, pigtails, connectors, fiber optic connectors, optical splices, optical fibers, free-space, or a combination of the foregoing.

As used herein, the term "pigtail" means a one or more optical fibers that extend from a ferrule. The optical fibers may each be terminated with a fiber optical connector but are not required to be terminated with a connector.

Disclosed herein are wavelength-division multiplexing devices. In particular, disclosed is a wavelength-division multiplexing (WDM) device with WDM filters having different angles of incidence (AOIs) and WDM filters and channel ports oriented to decrease the device footprint and provide shorter signal travel distances between components such as WDM filters and ports. It is noted that the features discussed herein can be used in a variety of applications, including NG-PON2 applications.

Figure 3A:
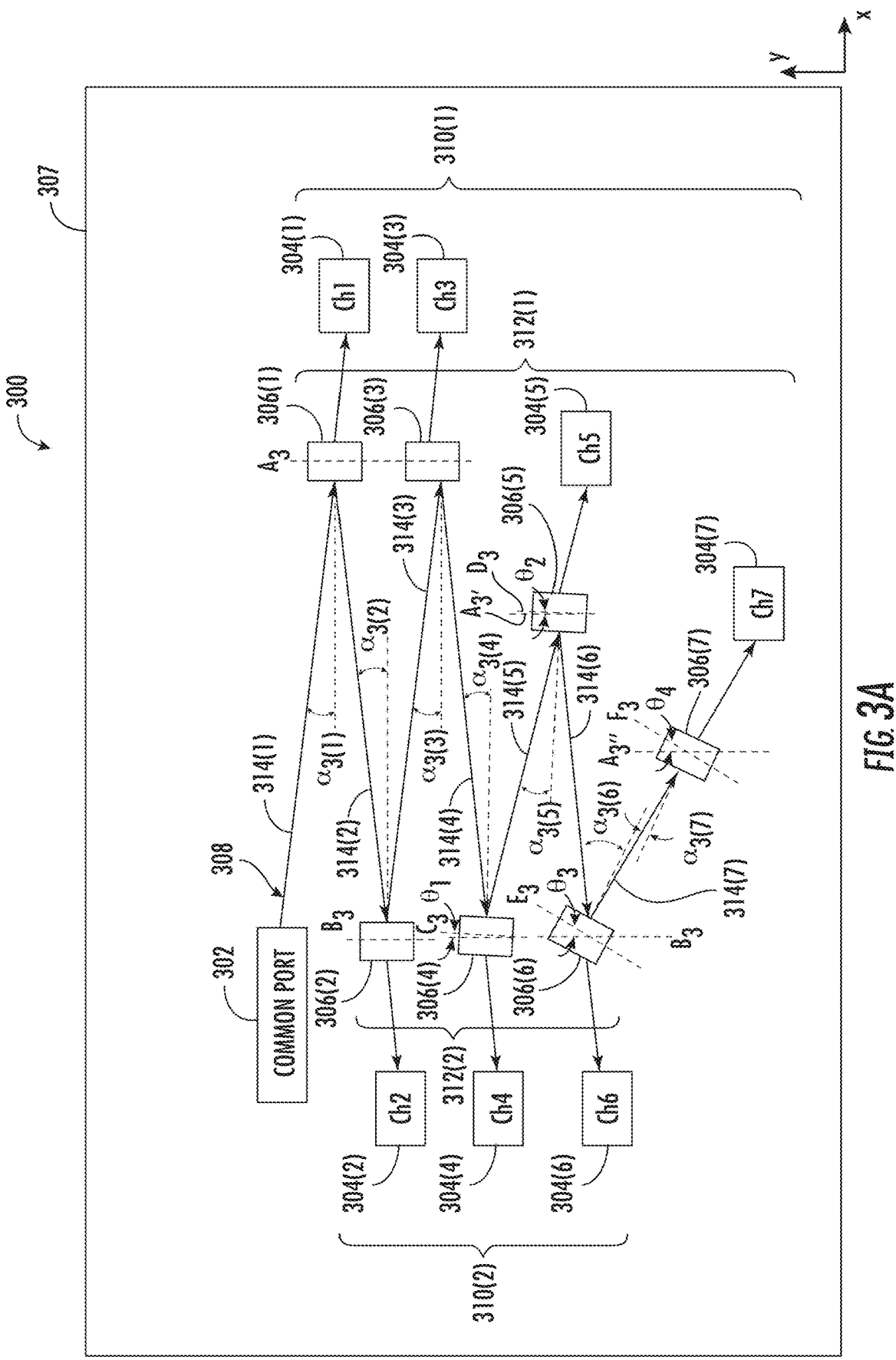
FIG. 3A is a top view of a WDM device with different angles of incidence (AOIs)
Figure 3B:
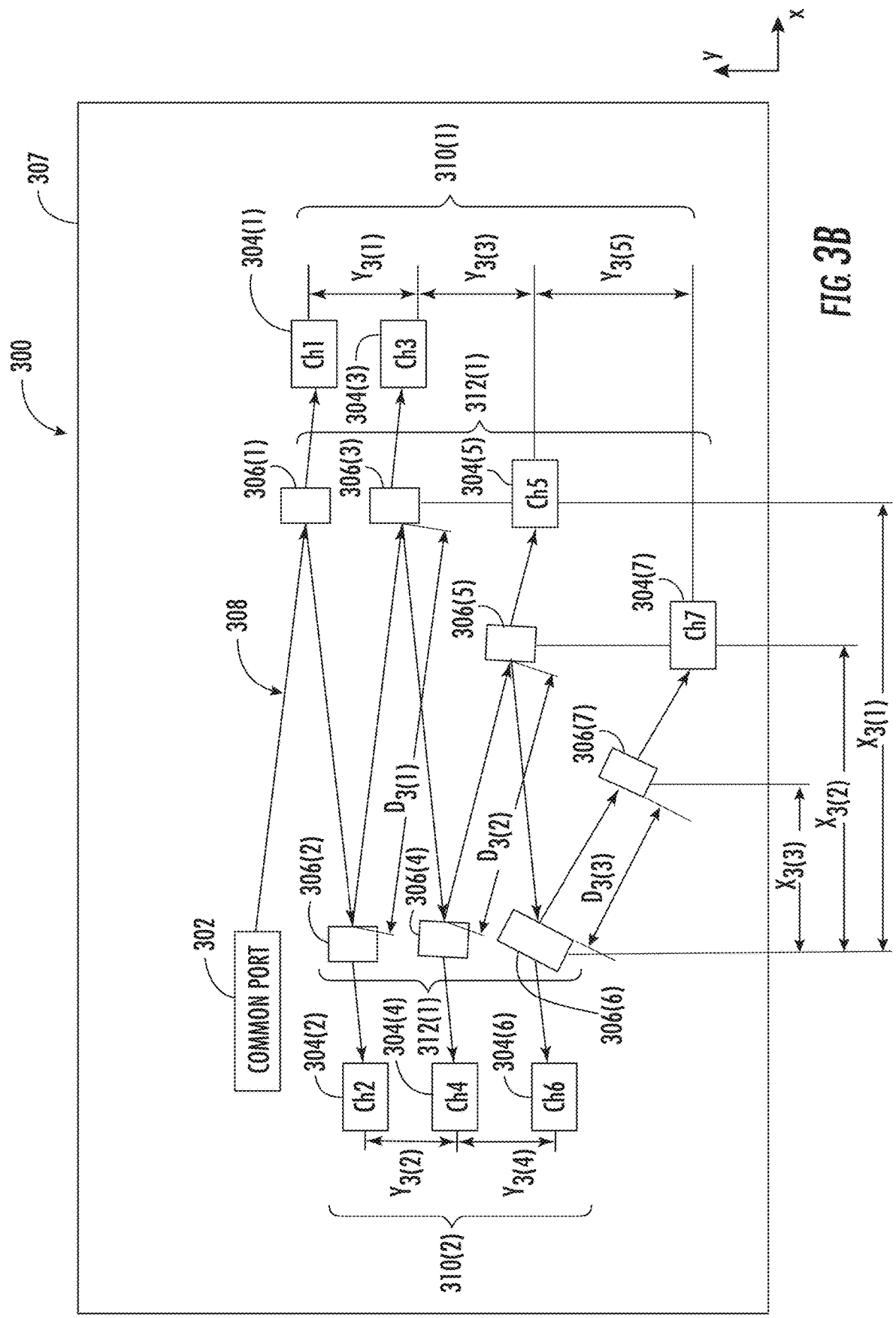
FIG. 3B is a top view of the WDM device of FIG. 3A illustrating a decreased footprint by using different AOIs.

FIGS. 3A and 3B are diagrams illustrating a WDM device 300 (may also be referred to as a micro-optical device, WDM optical device, multiplexer/demultiplexer, etc.) with different AOIs from variable placement and orientation of WDM filters and channel ports. The WDM device 300 includes a common port 302, a plurality of channel ports 304(1)-304(7) (may be referred to generally as channel ports 304), a plurality of WDM filters 306(1)-306(7) (may be referred to generally as a WDM filter 306) and a housing 307. As illustrated in FIGS. 3A and 3B, in some embodiments the first WDM filter 306(1) and the second WDM filter 306(2) are located in the housing 307. Although the channel ports 304 are illustrated as being completely within the housing 307, in some embodiments one or more of the channel ports (e.g., the first channel port 304(1) and the second channel port 304(2)) are collimators that are located at least partially within the housing 307 (i.e., extending partially from the housing 307). It is noted that other configurations of the WDM device 300 may be used, for example, including more or fewer common ports 302, channel ports 304, and/or WDM filters 306, and/or other layouts of such components in a housing 307.

The common port 302 is configured for optical communication of a multiplexed signal (also called a first multiplexed signal) including a plurality of individual, demultiplexed signals (e.g., first, second, third, fourth, fifth, sixth, seventh, etc. signals; also called the first demultiplexed signal, the second demultiplexed signal, the third demultiplexed signal, the fourth demultiplexed signal, the fifth demultiplexed signal, the sixth demultiplexed signal, the seventh demultiplexed signal, etc.). The individual, demultiplexed signals may be referred to as a first signal, a second signal, a third signal, a fourth signal, etc. Each of the channel ports 304 is configured for optical communication of at least one of the plurality of demultiplexed signals. The WDM filters 306 (may also be referred to as optical filters) are configured for routing the demultiplexed signals to the channel ports 304. In particular, each of the WDM filters is wavelength selective including a passband (e.g., coating, thin film filter, etc.) to allow a portion of the multiplexed signal to pass through the WDM filter 306 and to reflect a remaining portion of the multiplexed signal. Each WDM filter 306 may have a single passband or multiple passbands. For example, in certain applications (e.g., NG-PON2 applications) one or more of the WDM filters 306 may be a multi-passband filter.

The WDM filters 306 are arranged such that a multiplexed optical signal from the common port 302 can pass between the WDM filters 306 to successive ones of the WDM filters 306 for successive wavelength-selective reflection or transmission to the channel ports 304. Additionally, the WDM filters 306 are arranged such that demultiplexed optical signals from the channel ports 304 can pass between the WDM filters 306 in a back-and-forth progression along an optical signal path 308 for multiplexing at successive ones of the WDM filters 306 and multiplexed transmission to the common port 302. In other words, the optical signal path 308 comprises the multiplexed signal and the multiplexed signal comprises the demultiplexed signals (e.g., the first demultiplexed signal, the second demultiplexed signal, the third demultiplexed signal, etc.). In the particular embodiment illustrated in FIG. 3A, the common port 302 serves as an input/output (I/O) port for a multiplexed signal having wavelengths $\lambda_1$-$\lambda_7$ while the channel ports 304 serve as the seven individual channel ports. The WDM filters 306 are respectively configured to transmit wavelengths $\lambda_1$, $\lambda_2$, $\lambda_3$, $\lambda_4$, $\lambda_5$, $\lambda_6$, and $\lambda_7$, (where wavelengths may include multiple discrete wavelengths) and reflect the other wavelengths. In a DeMux operation, the multi-wavelength light exits the common port 302 that defines the I/O port and travels towards the first WDM filter 306(1). The first WDM filter 306(1) transmits the wavelength $\lambda_1$ to the first channel port 304(1) and reflects the remaining wavelengths $\lambda_1$-$\lambda_7$ multi-wavelength light. This reflected multi-wavelength light then proceeds to the second WDM filter 306(2), which transmits the wavelength $\lambda_2$ to the second channel port 304(2) and reflects the remaining wavelengths $\lambda_3$-$\lambda_7$ of multi-wavelength light. This process is repeated for the remaining WDM filters 306(3)-306(7) and channel ports 304(3)-304(7) so that the wavelength components $\lambda_3$-$\lambda_7$ of the multi-wavelength light are distributed to their respective channel ports 304(3)-304(7). In the Mux operation, the direction of the light is reversed and the individual wavelengths $\lambda_1$-$\lambda_7$ from the individual channel ports 304(1)-304(7) are recombined by the WDM filters 306(1)-306(4) into a multiplexed signal that is passed to the common port 302.

The WDM filters 306 include a first WDM filter 306 (e.g., WDM filter 306(1)) having a first passband and a first maximum AOI, a second WDM filter 306 (e.g., WDM filter 306(6)) having a second passband and a second maximum AOI which may be different than the first maximum AOI. The AOI is the angle that the signal makes relative to a perpendicular of a surface of the filter at the point of incidence. The first WDM filter 306(1) is configured to pass a first demultiplexed signal (also called the "first signal") of the multiplexed signal at a first AOI that is less than the first maximum AOI, and the second WDM filter 306(2) is configured to pass a second demultiplexed signal (also called the "second signal") of the multiplexed signal at a second AOI that is less than the second maximum AOI. The second AOI at the second WDM filter 306 is different than the first AOI at the first WDM filter 306. By relative variable rotation and translation of the WDM filters 306 to create different AOIs at the first and second WDM filters 306(1), 306(2), a footprint of the WDM device 300 may be reduced, and a length of the optical signal path 308 may also be reduced, which can improve performance and reliability, as described in more detail below.

The channel ports 304 are divided into a first channel array 310(1) and a second channel array 310(2). The WDM filters 306 are divided into a first WDM array 312(1) and a second WDM array 312(2). The distance between adjacent WDM filters 306 is configured so that the adjacent WDM filters 306 do not interfere with the optical signal path 308. As explained in more detail below, in some embodiments the WDM filters 306(1), 306(2), 306(3) have a first maximum AOI (e.g., less than about 6°, between about 6° and about 3°, about 6°, the WDM filters 306(4), 306(5) have a second maximum AOI (e.g., greater than about 6° and less than about 10°, between about 8° and about 10°, about 10°, and the WDM filters 306(6), 306(7) have a third maximum AOI (e.g., greater than about 6° and less than about 14°, between about 8° and about 14°, greater than about 10° and less than about 14°, about 14°), where the first maximum AOI, the second maximum AOI, and the third maximum AOI are different from one another. In some embodiments, the difference between the first maximum AOI, the second maximum AOI, and the third maximum AOI is greater than about 5% difference, greater than about 10% difference, greater than about 20% difference, greater than about 30% difference, greater than about 40% difference, or greater than about 50% difference. The WDM filters 306 with the same AOI are parallel to each other and the optical length is designed according to the AOI.

The WDM filters 306(1), 306(2), 306(3) have a small maximum AOI (e.g., less than or equal to about 6°). Accordingly, the first WDM filter 306(1) and the third WDM filter 306(3) are aligned along axis A3 and the second, fourth and sixth WDM filters 306(2), 306(4), 306(6) are aligned along axis B3, which is parallel to and offset from axis A3. As used herein, the terms "align," "aligned" or similar terms mean that two or more features of the WDM device share an axis. The third, fifth and seventh WDM filters 306(3), 306(5), 306(7) are not aligned (i.e., each WDM filter is positioned on separate, spaced-apart axis).

The common port 302 transmits a multiplexed signal to the first WDM filter 306(1) along a first portion 314(1) of the optical signal path 308 which intersects the first WDM filter 106(1) at a first AOI α3(1). A portion of the multiplexed signal (e.g., the second, third, fourth, fifth, sixth and seventh signals; also called the "first remaining multiplexed signal") is reflected by the first WDM filter 306(1) and transmits along a second portion 314(2) of the optical signal path 308 which intersects the second WDM filter 306(1) at a second AOI α3(2). In some embodiments, the second AOI α3(2) is the same as the first AOI α3(1). A portion of the multiplexed signal (e.g., the third, fourth, fifth, sixth and seventh signals; also called the "second remaining multiplexed signal") is reflected by the second WDM filter 306(2) and transmits along a third portion 314(3) of the optical signal path 308 which intersects the third WDM filter 306(3) at a third AOI α3(3). In some embodiments, the third AOI α3(3) is also the same as the first AOI α3(1) and the second AOI α3(2).

A portion of the multiplexed signal (e.g., the fourth, fifth, sixth and seventh signals; also called the "third remaining multiplexed signal") is then reflected by the third WDM filter 306(3) and transmits along a fourth portion 314(4) of the optical signal path 308 which intersects the fourth WDM filter 306(4) at a fourth AOI α3(4). In some embodiments, the fourth WDM filter 306(4) has a larger maximum AOI (e.g., about 10°) than the maximum AOI of the WDM filters 306(1), 306(2), 306(3). The fourth WDM filter 306(4) is positioned on axis C3 and is horizontally aligned with the second WDM filter 306(2) (i.e., intersects axis B3), but is rotationally offset from axis B3 by angle ⊖1 (a non-parallel angle). In other words, a filtering surfaces of the first WDM filter 306(1), the second WDM filter 306(2) and the third WDM filter 306(3) are parallel. However, the filtering surface of the fourth WDM filter 306(4) and a filtering surface of the third WDM filter 306(3) are non-parallel.

In addition, the fourth AOI α3(4) is different than the third AOI α3(4). More specifically, in some embodiments the fourth AOI α3(4) is larger than the third AOI α3(4).

A portion of the multiplexed signal (e.g., the fifth, sixth and seventh signals; also called the "fourth remaining multiplexed signal") is then reflected by the fourth WDM filter 306(4) and transmits along a fifth portion 314(5) of the optical signal path 308, which intersects the fifth WDM filter 306(5) at a fifth AOI α3(5). The fifth WDM filter 306(5) has the same maximum AOI (e.g., about 10°) as the fourth WDM filter 306(4). As such, the maximum AOI of the fifth WDM filter 306(5) is larger than the maximum AOI of WDM filters 306(1), 306(2), 306(3), 306(4). The fifth WDM filter 306(5) defines axis D3 that is laterally offset from axis A3 (along axis A3' toward the second WDM array 312(2)) and is parallel to axis C3 (i.e., rotationally offset from axis A3' and B3 by angle ⊖2 (a non-parallel angle)). In other words, the angle ⊖1 is equal to the angle ⊖2 and the filtering surface of the fifth WDM filter 306(5) and the filtering surface of the fourth WDM filter 306(4) are parallel. Accordingly, the fifth AOI α3(5) is larger than AOIs α3(1), α3(2), α3(3) but is equal to the fourth AOI α3(4).

The fifth WDM filter 306(5) is not aligned with the first and third WDM filters 305(1), 306(3) along the axis A3. As such, the portion 314(5) of the optical signal path 308 between the fourth WDM filter 306(4) and the fifth WDM filter 306(5) is smaller than the portion 314(2) of the optical signal path 308 between the first WDM filter 306(1) and the second WDM filter 306(2). The shorter optical signal path 308 decreases signal loss and increases performance compared with a typical WDM device (e.g., the WDM device 100 of FIG. 1).

A portion of the multiplexed signal (e.g., the sixth and seventh signals; also called the "fifth remaining multiplexed signal") is reflected by the fifth WDM filter 306(5) and transmits along a sixth portion 314(6) of the optical signal path 308, which intersects the sixth WDM filter 306(6) at a sixth AOI α3(6). The sixth WDM filter 306(6) has a larger maximum AOI (e.g., 14°) than those of WDM filters 306(1), 306(2), 306(3), 306(4), 306(5). The sixth WDM filter 306(6) defines axis E3 that is horizontally aligned with the second WDM filter (i.e., intersects axis B3), but is rotationally offset from axis B3 by angle ⊖3 (a non-parallel angle). In some embodiments, the angle ⊖3 is not equal to the angle ⊖2 and, thus, the filtering surface of the sixth WDM filter 306(6) and the filtering surface of the fifth WDM filter 306(5) are non-parallel.

The sixth AOI α3(6) is different than the fifth AOI α3(5) and, more specifically, in some embodiments the sixth AOI α3(6) is larger than the fifth AOI α3(5). Accordingly, the sixth AOI α3(6) is larger than AOIs α3(1), α3(2), α3(3), α3(4), α3(5).

In addition, because the fifth WDM filter 306(5) is not aligned with the first and third WDM filters 305(1), 306(3) along the axis A3, the portion 314(6) of the optical signal path 308 between the fifth WDM filter 306(5) and the sixth WDM filter 306(6) is smaller than the portion 314(2) of the optical signal path 308 between the first WDM filter 306(1) and the second WDM filter 306(2). The shorter optical signal path 308 decreases signal loss and increases performance compared with a typical WDM device (e.g., the WDM device 100 of FIG. 1).

A portion of the multiplexed signal (e.g., the seventh signal) is reflected by the sixth WDM filter 306(6) and transmits along a seventh portion 314(7) of the optical signal path 308 which intersects the seventh WDM filter 306(7) at a seventh AOI α3(7). The seventh WDM filter 306(7) may have the same maximum AOI (e.g., 14°) as the sixth WDM filter 306(6), but could be configured for any AOI because it is the last WDM filter 306 in the optical signal path 308. In other words, the seventh WDM filter 306(7) is the last WDM filter and does not have to route a reflection portion of the signal. In the embodiment illustrated in FIGS. 3A and 3B, however, the seventh AOI is equal to the sixth AOI.

The seventh WDM filter 306(7) defines axis F3 that is laterally offset from axis A3 (along axis A3" toward the second WDM array 312(2)) and parallel to axis E3. As such, the filtering surface of the seventh WDM filter 306(7) and the filtering surface of the sixth WDM filter 306(6) are parallel.

In addition, because the seventh WDM filter 306(7) is not aligned with the first and third WDM filters 306(1), 306(3) along the axis A3, or the fifth WDM filter 306(5) along the axis D3, the portion 314(7) of the optical signal path 308 between the sixth WDM filter 306(6) and the seventh WDM filter 306(7) is smaller than the portion 314(2) of the optical signal path 308 between the first WDM filter 306(1) and the second WDM filter 306(2). The shorter optical signal path 308 decreases signal loss and increases performance compared with a typical WDM device (e.g., the WDM device 100 of FIG. 1).

As noted above, the different AOIs of the WDM device 300 allow for a smaller footprint and shorter optical signal path 308. FIG. 3B is a view similar to FIG. 3A of the WDM device 300 except that in FIG. 3B, the decreased footprint of the WDM device 300 is shown by calling out the distances between the filters 306(1)-306(7) and channel ports 304(1)-304(7). In particular, the vertical distances Y3(1), Y3(2), Y3(3), Y3(4) and Y3(5) between the adjacent channel ports 304(1), 304(2), 304(3), 304(4), 304(5), 304(6), and 304(7), respectively, may be smaller than a typical WDM device (e.g., the WDM device 100 illustrated in FIG. 1), and the horizontal distances X3(1), X3(2), and X3(3) may also be reduced compared with a typical WDM device (e.g., the WDM device 100 illustrated in FIG. 1). For example, the first WDM filter 306(1) is a distance X3(1) (e.g., 14.4 mm) from the second WDM array 312(2) and the fifth WDM filter 306(5) is a distance X3(2) (e.g., 8.6 mm) from the second WDM array 312(2). The seventh WDM filter 306(7) is a distance X3(3) (e.g., 6.2 mm) from the second WDM array 312(2). As a result, the distance of the optical signal path 308 is reduced, which may reduce signal loss or distortion and may simplify the alignment process and assembly of the WDM device 300 during manufacturing. In particular, the distance of the third portion 314(3) of the optical signal path 308 is a distance D3(1), the distance of the fifth portion 314(5) of the optical signal path 308 is distance D3(2), and the distance of the seventh portion 314(7) of the optical signal path 308 is distance D3(3). Accordingly, the seventh portion 314(7) of the optical signal path 308 is less than the fifth portion 314(5), which is less than the third portion 314(3). The shorter optical signal path 308 decreases signal loss and increases performance compared with a typical WDM device (e.g., the WDM device 100 of FIG. 1).

It is noted that although the channel ports 304(2), 304(4) and 304(6) in FIGS. 3A and 3B are aligned, the location and orientation of the channel ports 304(2), 304(4) and 304(6) may be modified to modify the footprint of the WDM device 300. Similarly, the location and orientation of the channel ports 304(1), 304(3), 304(5) and 304(7) may also be modified to modify the footprint of the WDM device 300.

Further, it is noted that while only the WDM filters 306 in the first WDM array 312(1) were laterally translated relative to the second WDM array 312(2) in the example embodiments described above, in other embodiments the WDM filters 306 in the second WDM array 312(2) may also be translated (in other words, the location and orientation of the WDM filters 306 in the second WDM array 312(2) may be modified alone or in addition to modifying the WDM filters 306 in the first WDM array 312(1)).

While the WDM device 300 illustrated in FIGS. 3A and 3B includes seven WDM filters 306(1)-306(7) and seven channel ports 304(1)-304(7), the WDM device may include any number of WDM filters and channel ports as long as at least two of the signal path intersects at least two of the WDM filters at different AOIs. For example, the WDM device may include one or more common ports configured for optical communication of multiplexed signals comprising one or more demultiplexed signals, and at least two WDM filters and two channel ports, wherein the AOI at the first WDM filter is different than the AOI at the second WDM filter. The difference in AOI between the first WDM filter and the second WDM filter may allow for a smaller footprint and a shorter signal path, as described above.

In addition, the WDM filters having different AOIs need not be placed within the WDM device exactly as illustrated in FIGS. 3A and 3B. For example, in other embodiments, the WDM device may have seven WDM filters, and the WDM filters having different AOIs may be the first and second WDM filters rather than the third and fourth (or fifth and sixth) as illustrated in FIGS. 3A and 3B. In addition, the WDM filters having different AOIs need not be sequential WDM filters. Thus, in another example having seven WDM filters, the WDM filters having different AOIs may be the first and fifth WDM filters.

In addition, it may not be required to have two or more WDM filters with the same AOI. In other words, all of the WDM filters in a WDM device may have different AOIs. For example, in a WDM device having only two WDM filters, the AOI at the first WDM filter may be different than the AOI at the second WDM filter. Likewise, in a WDM device having more than two WDM filters (e.g., ten WDM filters), all of the ten WDM filters may have a unique WDM filter. Of course, a WDM device may include a mixture of WDM filters having the same AOI and WDM filters having different AOIs, as was illustrated in FIGS. 3A and 3B herein.

In another specific example, a WDM device includes a first common port that is configured for optical communication of a multiplexed signal (the multiplexed signal includes a first demultiplexed signal and a second demultiplexed signal). The WDM device also includes a first channel port configured for optical communication of the first demultiplexed signal and a second channel port configured for optical communication of the second demultiplexed signal. The WDM device also includes a first WDM filter configured to pass the first demultiplexed signal of the first multiplexed signal at a first angle of incidence (AOI) and reflect the second demultiplexed signal of the first multiplexed signal, and a second WDM filter configured to pass the second demultiplexed signal of the first multiplexed signal at a second AOI. The second AOI may be different than the first AOI and, specifically, the second AOI may be larger than the first AOI. In addition, the filtering surface of the first WDM filter and the filtering surface of the second WDM filter may be non-parallel.

Figure 3C:
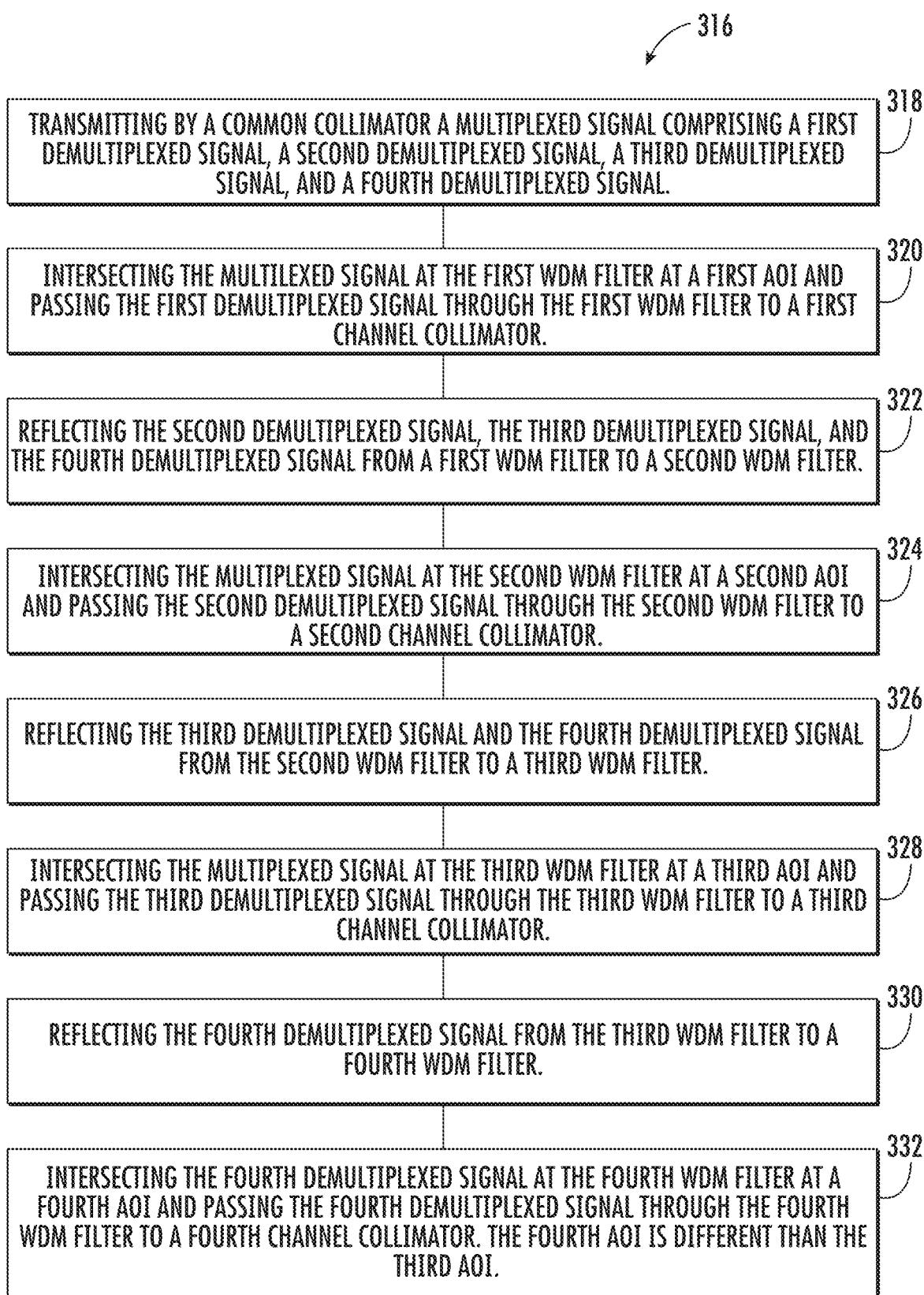
FIG. 3C is a flowchart of steps for using the WDM device of FIGS. 3A-3B.

FIG. 3C is a flowchart of steps 316 for using a WDM device such as the WDM device 300 illustrated in FIGS. 3A and 3B. In step 318, a common collimator (e.g., common port 302) transmits a multiplexed signal comprising a first demultiplexed signal (first signal), a second demultiplexed signal (second signal), a third demultiplexed signal (third signal) and a fourth demultiplexed signal (fourth signal). In step 320, a multiplexed signal intersects the first WDM filter 306(1) at a first AOI (e.g., AOI α3(1)) and passes the first demultiplexed signal through the first WDM filter to a first channel collimator (e.g., first channel port 304(1)). In step 322, the second demultiplexed signal, the third demultiplexed signal, and the fourth demultiplexed signal are reflected from a first WDM filter (e.g., WDM filter 306(1)) to a second WDM filter (e.g., WDM filter 306(2)).

In step 324, the multiplexed signal intersects the second WDM filter (e.g., WDM filter 306(2)) at a second AOI (e.g., AOI α3(2)) and passes the second demultiplexed signal through the second WDM filter to a second channel collimator (e.g., second channel port 304(2)).

In step 326, the third demultiplexed signal and the fourth demultiplexed signal are reflected from the second WDM filter (e.g., WDM filter 306(2)) to a third WDM filter (e.g., WDM filter 306(3)).

In step 328, the multiplexed signal intersects the third WDM filter (e.g., WDM filter 306(3)) at a third AOI (e.g., AOI α3(3)) and passes the third demultiplexed signal through the third WDM filter to a third channel collimator (e.g., third channel port 304(3)).

In step 330, the fourth demultiplexed signal is reflected from the third WDM filter (e.g., WDM filter 306(3)) to a fourth WDM filter (e.g., WDM filter 306(4)).

In step 332, the fourth demultiplexed signal intersects the fourth WDM filter (e.g., WDM filter 306(4)) at a fourth AOI (e.g., AOI α3(4)) and passes the fourth demultiplexed signal through the fourth WDM filter to a fourth channel collimator (e.g., third channel port 304(4)). In some embodiments, the fourth AOI is different than the third AOI, as described above.

Figure 4A:
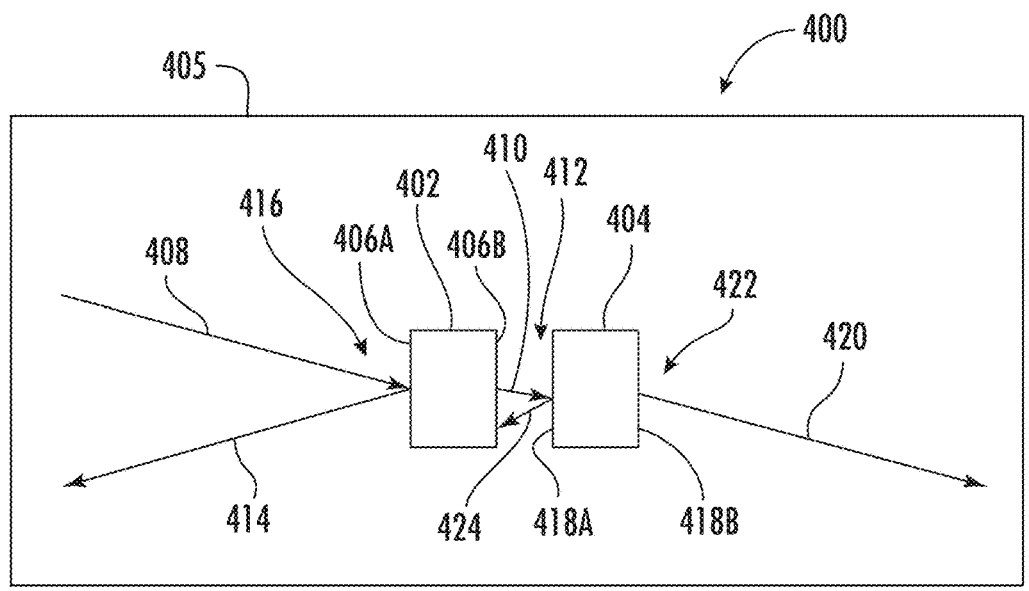
FIG. 4A is a diagram illustrating a stacked WDM filter subassembly for increased signal isolation.

FIG. 4A is a diagram illustrating a stacked WDM filter subassembly 400 for increased signal isolation. The stacked WDM subassembly 400 may be used with any of the WDM devices discussed above. The stacked WDM filter subassembly 400 includes a primary WDM filter 402 and a secondary WDM filter 404 which may be positioned in a housing 405. The primary WDM filter 402 and the secondary WDM filter 404 may include the same passband (e.g., with the same maximum AOI) to increase signal isolation.

The primary WDM filter 402 has a first surface 406A and a second surface 406B opposite the first surface 406A. When a multiplexed signal intersects with the primary WDM filter 404 along an input optical signal path 408, any demultiplexed signal within the passband transmits through the WDM filter 404 along an intermediate optical signal path 410 on an intermediate side 412 of the primary WDM filter 404. The remaining portion of the multiplexed signal outside of the passband is reflected by the primary WDM filter 402 along a reflected optical signal path 414 on the reflection side 416 of the primary WDM filter 402.

The secondary WDM filter 404 has a first surface 418A and a second surface 418B opposite the first surface 418A. When a demultiplexed signal intersects with the first secondary WDM filter 404 along the intermediate optical signal path 410, any demultiplexed signal within the passband transmits through the second WDM filter 404 along a transmission optical signal path 420 on a transmission side 422 of the primary WDM filter 402. The remaining portion of the multiplexed signal outside of the passband is reflected by the secondary WDM filter 404 along a second reflected optical signal path 424 on the intermediate side 421 of the secondary WDM filter 404. In this way, the secondary WDM filter 404 reflects at least a portion of any signal leakage that occurs through the primary WDM filter 402, thereby increasing signal isolation. In particular, a typical value of isolation for a single WDM filter may be about 25-45 dB (depending on the band(s) and AOI). However, in certain embodiments, using two stacked filters with 25 dB isolation can have an effective isolation of 50 dB.

It is noted that alternatively, the two WDM filters could be adhered together, so that there is no free space in between. Also alternatively, a primary WDM filter 402 could be used with a first dielectric coating on the first surface and a second dielectric coating on the second surface. However, in either case two WDM filters separated by free space provides easier fine tuning.

Figure 4B:
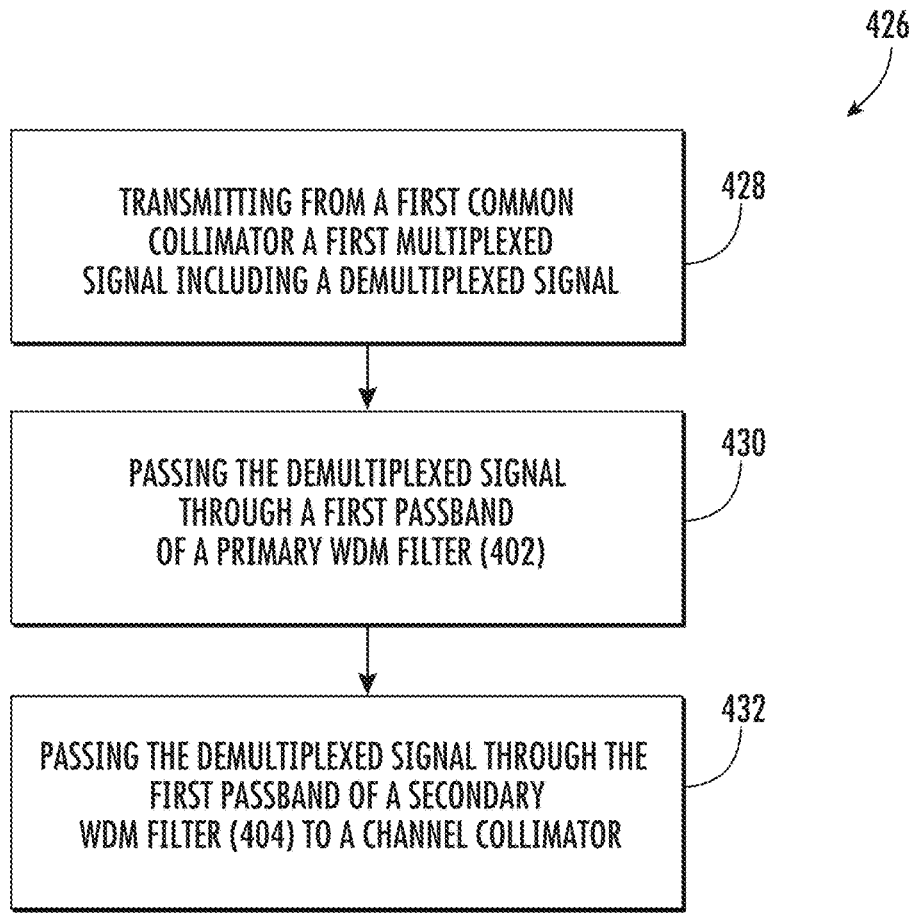
FIG. 4B is a flowchart of steps for isolating a WDM signal using the stacked WDM filter subassembly of FIG. 4A.

FIG. 4B is a flowchart of steps 426 for isolating a WDM signal. In step 428, a first common collimator transmits a first multiplexed signal comprising a demultiplexed signal. In step 430, the demultiplexed signal is passed through a first passband of a primary WDM filter 402. In step 432, the demultiplexed signal is passed through the first passband of a secondary WDM filter 404 to a channel collimator.

Figure 5:
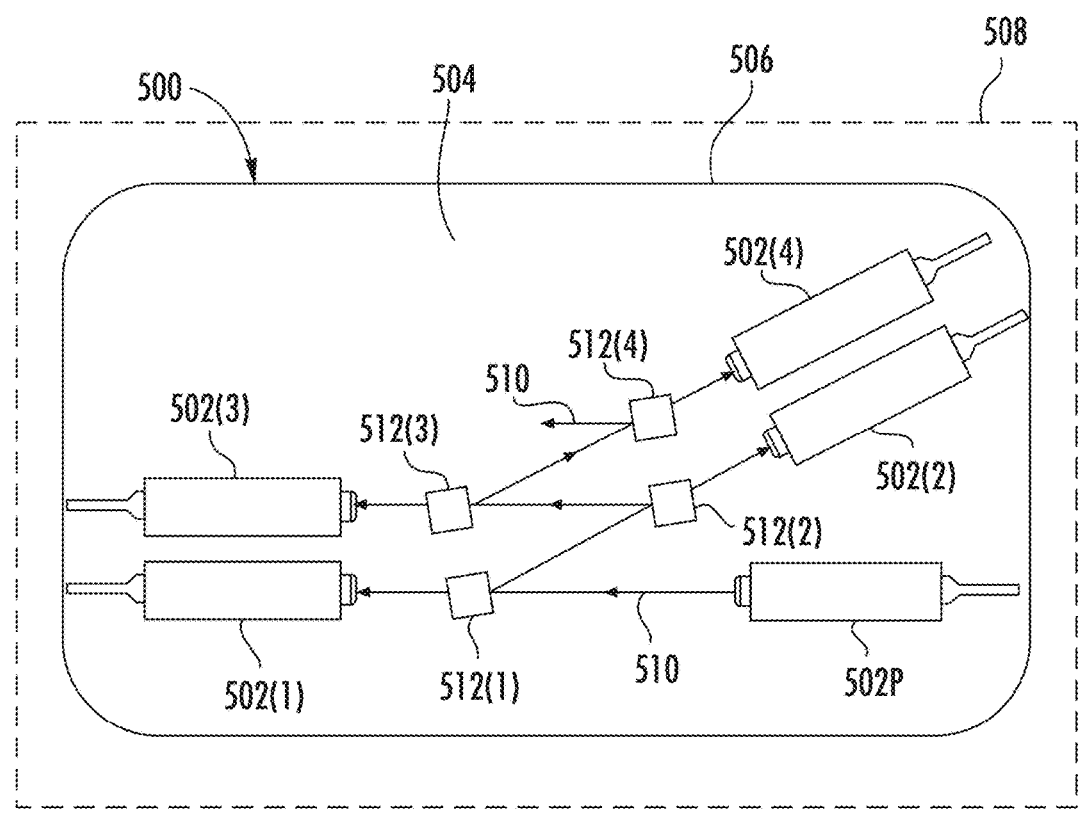
FIG. 5 is a top view of an example micro-optical device including the different AOIs and/or stacked WDM subassembly of FIGS. 3A-4B.

FIG. 5 is a top view of a micro-optical device 500 that could be used with any of the above embodiments. In general, the micro-optical device 500 includes at least one micro-collimator 502 (e.g., collimators 502P and 502(1)-502(4)) supported on an upper surface 504 of a support substrate 506. In an example, the micro-optical device 500 can include a housing 508 that defines a WDM module. In an example, the WDM module can have a small form factor as defined by length (e.g., in the range of 30 mm to 41 mm), width (e.g., in the range of 14 mm to 28 mm), and height (within the range of 5 mm to 6 mm).

The particular example of micro-optical device 500 (may also be referred to as a WDM micro-optical device 500) is in the form of a four-channel WDM device that employs five of the micro-collimators 502, including common collimator 502P and channel collimators 502(1)-502(4)), in optical communication with each other along an optical signal path 510 via WDM filters 512(1)-512(4). It is noted that a more basic WDM micro-optical device 500 can employ only three micro-collimators 502 and is used to separate or combine two wavelengths. Likewise, more complicated WDM micro-optical devices 500 can employ many more micro-collimators 502 to separate or combine many more wavelengths besides two wavelengths or even four wavelengths (e.g., tens or even hundreds of different wavelengths). In examples, the WDM channels can be dense WDM (DWDM) channels or coarse WDM (CWDM) channels. Other types of micro-optical devices 500 besides the WDM micro-optical device described herein can also be formed using the basic techniques described herein. For example, the micro-optical device 500 can be used to form many types of free-space optical fiber devices, as well as compact variable optical attenuators, switches, optical amplifiers, taps, optical couplers/splitters, optical circulators, optical isolators, optical time-domain reflectometer (OTDRs), etc.

In an example, the support substrate 506 is made of glass (e.g., quartz) or sapphire. In another example, the support substrate 506 is made of a glass that is receptive to the formation of glass bumps. In other examples, the support substrate 506 can be made of stainless steel or silicon, a low-CTE metal alloy (e.g., having a CTE of <10 ppm/° C., or more preferably CTE <5 ppm/° C., or even more preferably CTE <1 ppm/° C.). Examples of metal alloys having such a low CTE include the nickel-iron alloy 64FeNi also known in the art under the registered trademarked INVAR® alloy or the nickel-cobalt ferrous alloy known in the art under the registered trademark KOVAR® alloy. In an example, the upper surface 504 is precision polished to be flat to within a tolerance of 0.005 mm so that the collimators 502 can be precision mounted to the upper surface 504. In an example, the support substrate 506 includes one or more reference features, such as alignment fiducials, for positioning and/or aligning the micro-collimators 502 and other optical components (e.g., optical filters, other micro-collimators, etc.).

FIGS. 6-10 are views of example collimators and collimator arrays for use with the components and devices of FIGS. 3A-5. In the embodiments described above, the common port 302 and the channel ports 304 may be collimators, such as the collimators described in FIGS. 6-10.

Figure 6:
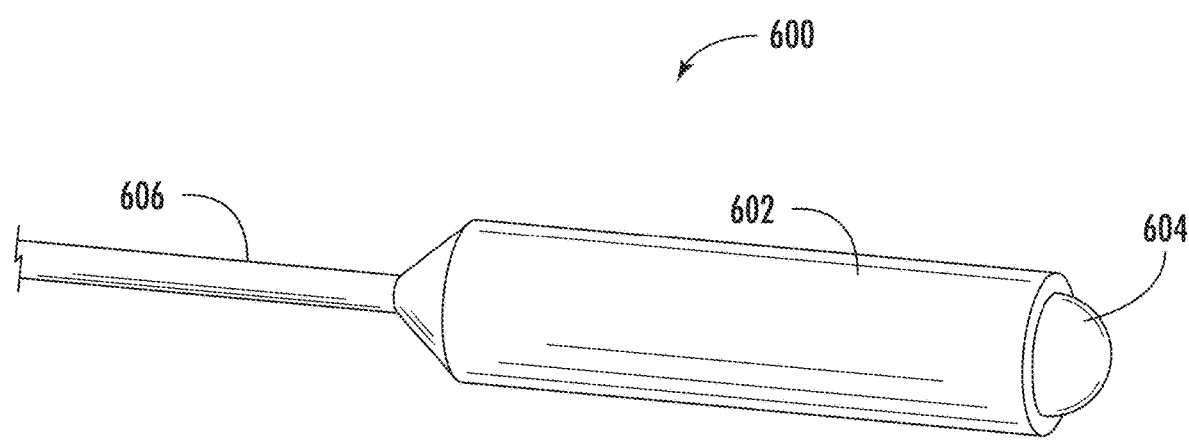
FIG. 6 is a perspective view of an example steel-tube collimator for use with the components and devices of FIGS. 3A-5.

FIG. 6 is a perspective view of an example steel-tube collimator 600 for use with the components and devices of FIGS. 3A-5. The collimator 600 narrows a beam of particles or waves. In other words, the collimator 600 causes the directions of motion to become more aligned in a specific direction. The steel-tube collimator 600 includes a steel-tube body 602, with a curved lens 604 at one end of the steel-tube body, and a fiber optic pigtail 606 at an opposite end of the steel-tube body.

Figure 7A:
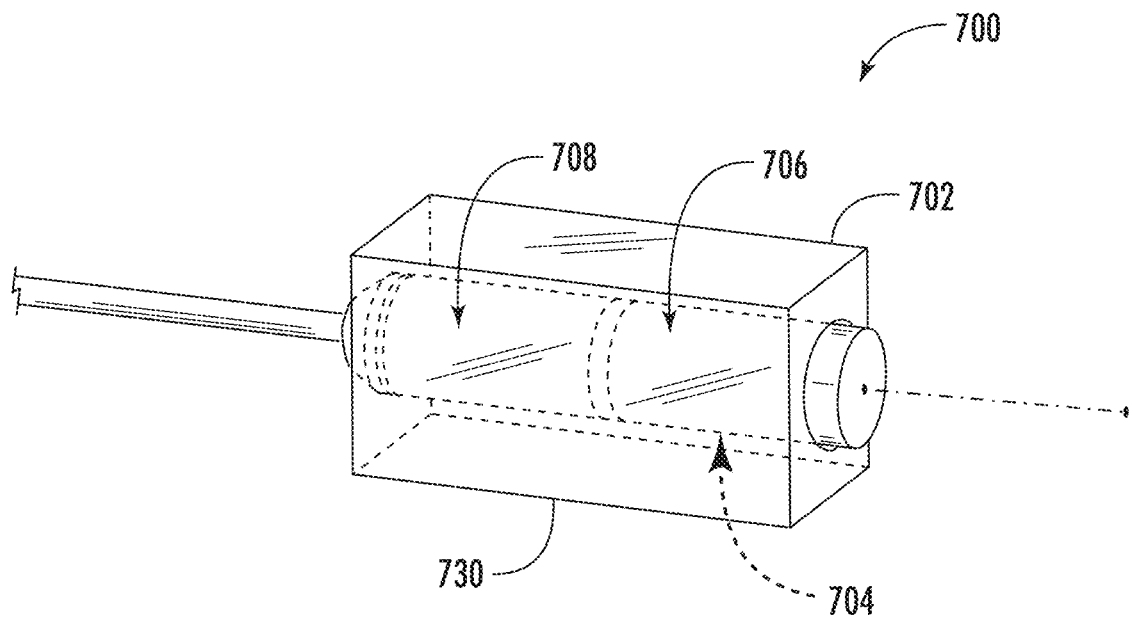
FIG. 7A is a perspective view of an example square tube collimator for use with the components and devices of FIGS. 3A-5.
Figure 7B:
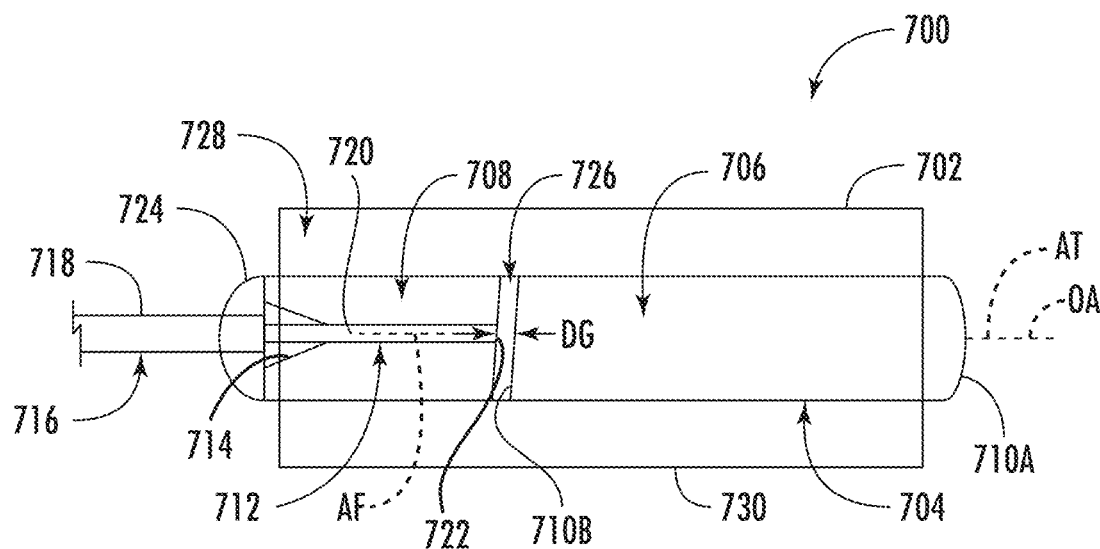
FIG. 7B is a cross-sectional top view of the square tube collimator of FIG. 7A.

FIGS. 7A and 7B are views of an example square tube collimator for use with the components and devices of FIGS. 3A-5. The square tube collimator 700 includes a glass tube 702 (e.g., cylindrical) with a central bore 704. As used herein, the term "cylindrical" is used in its most general sense and can be defined as a three-dimensional object formed by taking a two-dimensional object and projecting it in a direction perpendicular to its surface. Thus, a cylinder, as the term is used herein, is not limited to having a circular cross-sectional shape but can have any cross-sectional shape, such as the square cross-sectional shape described below by way of example.

The square tube collimator 700 further includes optical elements, such as a collimating lens 706, ferrule 708, etc., which can be secured to the glass tube 702 using a securing mechanism (e.g., an adhesive). The collimating lens 706 has a front surface 710A and a back surface 710B opposite thereto. In the example shown, the front surface 710A is convex while the back surface 710B can be angled, e.g., in the x-z plane as shown. In an example, the front surface 710A of collimating lens 706 can reside outside of the central bore 704, i.e., the front-end portion of the collimating lens 706 can extend slightly past the front end of the glass tube 702. In an example, the collimating lens 706 can be formed as a gradient-index (GRIN) element that has a planar front surface 710A. In an example, the collimating lens 706 can consist of a single lens element, while in another example it can consist of multiple lens elements. In the discussion below, the collimating lens 706 is shown as a single lens element for ease of illustration and discussion.

The optical fiber support member is the form of a ferrule 708. The ferrule 708 includes a central bore 712 that runs between a front end and a back end along a ferrule central axis AF, which in an example is co-axial with the tube central axis AT of the glass tube 702 and the optical axis OA as defined by the collimating lens 706. The central bore 712 can include a flared portion 714 at the back end of the ferrule 708.

An optical fiber 716 has a coated portion 718, and an end portion 720 is bare glass (e.g., is stripped of the coated portion) and is thus referred to as the "bare glass portion." The bare glass portion 720 includes a polished end face 722 that defines a proximal end of the optical fiber. The bare glass portion 720 of the optical fiber 716 extends into the central bore 712 of the ferrule 708 at the back end of the ferrule 708. A securing element 724 can be disposed around the optical fiber 716 at the back end of the ferrule 708 to secure the optical fiber to the ferrule 708. The front end of the ferrule 708 is angled in the x-z plane and is axially spaced apart from the angled back end of the collimating lens to define a gap 726 that has a corresponding axial gap distance DG. While a glass optical fiber is described above, other types of optical fibers may be used, such as, for example, a plastic optical fiber.

The ferrule 708, optical fiber 716, and securing element 724 constitute a fiber optic pigtail 728, which can be said to reside at least partially within the bore 704 adjacent the back end of the glass tube 702. Thus, in an example, the square tube collimator 700 includes only the glass tube 702, the collimating lens 706, and the fiber optic pigtail 728. The glass tube 702 serves in one capacity as a small lens barrel that supports and protects the collimating lens 706 and the fiber optic pigtail 728, particularly the bare glass portion 720 and its polished end face 722. The glass tube 702 also serves in another capacity as a mounting member that allows for the square tube collimator 700 to be mounted to a support substrate. In this capacity, at least one flat surface 730 serves as a precision mounting surface.

In an example, the glass tube 702, the collimating lens 706, and the ferrule 708 are all made of a glass material, and further in an example, are all made of the same glass material. Making the glass tube 702, the collimating lens 706, and the ferrule 708 out of a glass material has the benefit that these components will have very close if not identical, coefficients of thermal expansion (CTE). This feature is particularly advantageous in environments that can experience large swings in temperature.

In an example, the optical elements used in micro-optical systems are sized to be slightly smaller than the diameter of the bore 704 (e.g., by a few microns or tens of microns) so that the optical elements can be inserted into the bore 704 and be movable within the bore 704 to a select location. In an example, the select location is an axial position where the optical element resides for the micro-optical system to have optimum or substantially optimum optical performance. Here, substantially optimum performance means performance that may not be optimum but that is within a performance or specification for the micro-optical system.

In another example, the optical elements have a clearance with respect to the bore 704 in the range of a few microns (e.g., 2 microns or 3 microns) to tens of microns (e.g., 20 microns up to 50 microns). A relatively small value for the clearance allows for the optical elements to be well-aligned with the central bore axis AB, e.g., to within a few microns (e.g., from 2 microns to 5 microns).

The optical elements and the support/positioning elements can be inserted into and moved within the bore 704 to their select locations using micro-positioning devices. The optical elements and the support/positioning elements can be secured within the bore 704 using a number of securing techniques. One example of a securing technique uses a securing feature that is an adhesive (e.g., a curable epoxy).

Another securing technique uses a securing feature that involves a glass soldering to create one or more glass solder points. Another securing technique uses glass welding to create a securing feature in the form of one or more glass welding points. A combination of these securing features can also be employed.

Thus, one or more optical elements can be secured within the bore 704 using one or more securing features, and can also be supported and/or positioned using one or more support/positioning elements. The non-adhesive securing techniques described below allow for the micro-optical systems disclosed herein to remain free of adhesives so that, for example, micro-optical systems can consist of glass only.

Figure 8A:
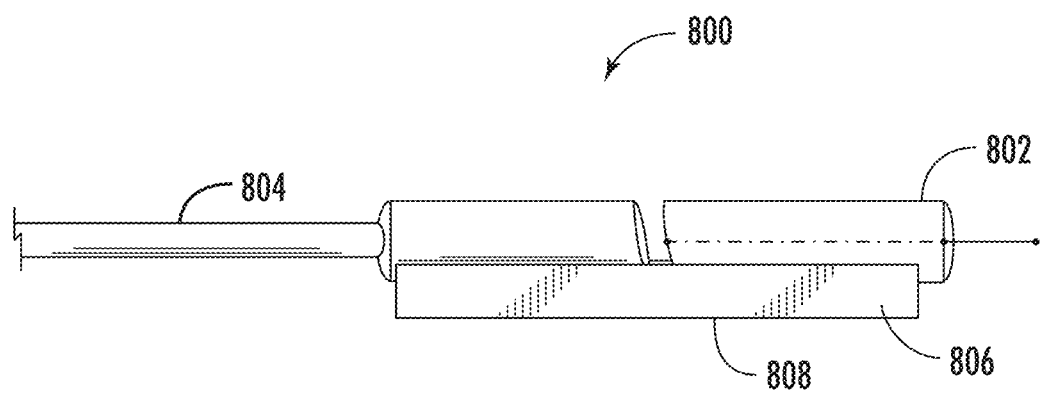
FIG. 8A is a side view of an example compact collimator for use with the components and devices of FIGS. 3A-5.

FIG. 8A is a side view of an example compact collimator for use with the components and devices of FIGS. 3A-5. A collimator 800 includes a lens 802 (e.g., a glass or silica collimating lens), a fiber optic pigtail 804, and a groove (e.g., a generally V-shaped groove) formed in a base 806. The lens 802 and the fiber optic pigtail 804 are disposed in the groove. The lens 802 is configured to receive a light signal provided to the WDM multiplexer/demultiplexer from an external optical transmission system or provide a light signal multiplexed or demultiplexed by the WDM to an external optical transmission system. The lens 802, for example, may be configured to receive a light signal from a fiber optic element for multiplexing or demultiplexing and/or to provide a multiplexed or demultiplexed light signal to an external fiber optic element. The fiber optic pigtail 804 is optically coupled to the lens 802 and is configured to provide a light signal to the lens 802 from the external fiber optic element and/or to receive the light signal from the lens 802 for transmission to the external fiber optic element.

In various embodiments, the lens 802 and the fiber optic pigtail 804 may or may not contact each other. The lens 802 and the fiber optic pigtail 804 may be securable to the groove independent of each other to allow for precise adjustment of a pointing angle between an optical beam from the collimator 800 and a side and/or bottom surface of the groove. In addition, the lens 802 and fiber optic pigtail 804 may have the same outer diameter.

The base 806 of the collimator 800 has a generally flat bottom surface 808 for mounting on a substrate of a WDM multiplexer/demultiplexer or other optical system. The base 806 further includes a width that is less than a width of the lens 802 and a width of the fiber optic pigtail 804.

Figure 8B:
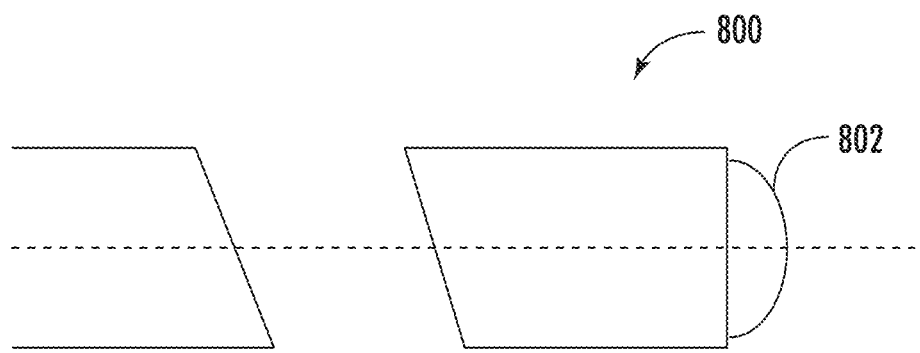
FIG. 8B is a close-up side view of the compact collimator of FIG. 8A.

FIG. 8B is a close-up side view of the compact collimator of FIG. 8A. A pointing angle between an optical beam from a collimator 800 and the side and bottom surface of the groove can be eliminated (or at least reduced) by controlling the relative position between the lens 802 and the fiber optic pigtail 804 (see FIG. 8A) of the collimator 800. By fine tuning the position of the fiber optic pigtail 804 to make an outgoing beam come across a focal point of the lens 802, a collimated zero pointing angled beam with negligible off axis offset can be achieved. In one embodiment, for example, the tuning can be monitored by near field and far field beam position comparison (e.g., using a beam scanner). The zero pointing angle collimating components are easier to attach to the substrate with little inclination, and more reliable bonding is possible due to the uniform epoxy or bonding agent. It is noted that FIG. 8B is a schematic illustration used to illustrate concepts of the description and that the ends of the glass lens and the fiber optic pigtail 804 may be oriented at other angles, including perpendicular, to the body of the glass lens and the fiber optic pigtail, respectively.

The structures of the collimator 800 allow for easier modularization and remove redundant degrees of freedom versus designs in which a collimator is coupled and attached to the substrate via external wedges or supports. Thus, the collimator 800 may reduce the complexity and further increase the device efficiency and process reliability of the overall multiplexer/demultiplexer design.

Figure 9A:
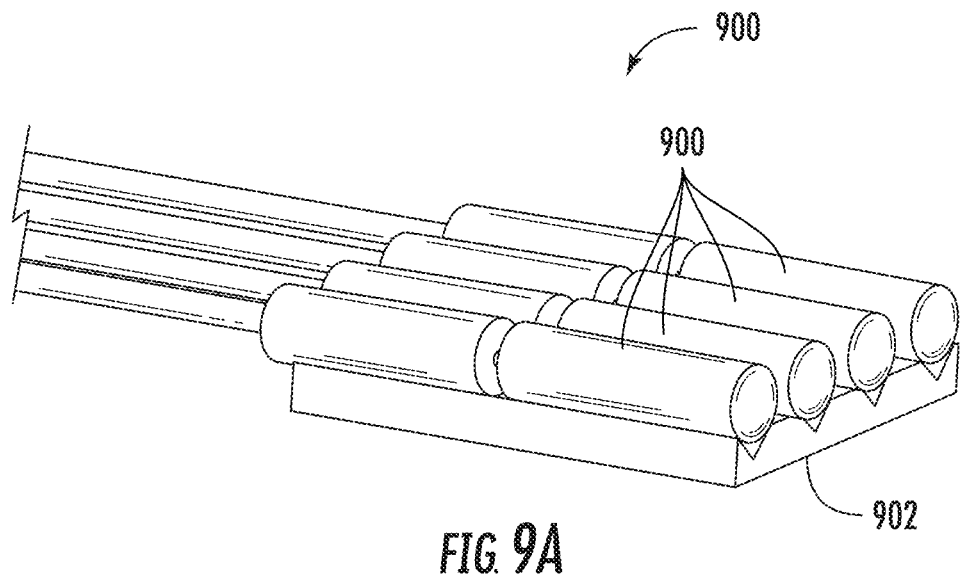
FIG. 9A is a perspective view of an example array of the compact collimators of FIGS. 8A-8B.
Figure 9B:
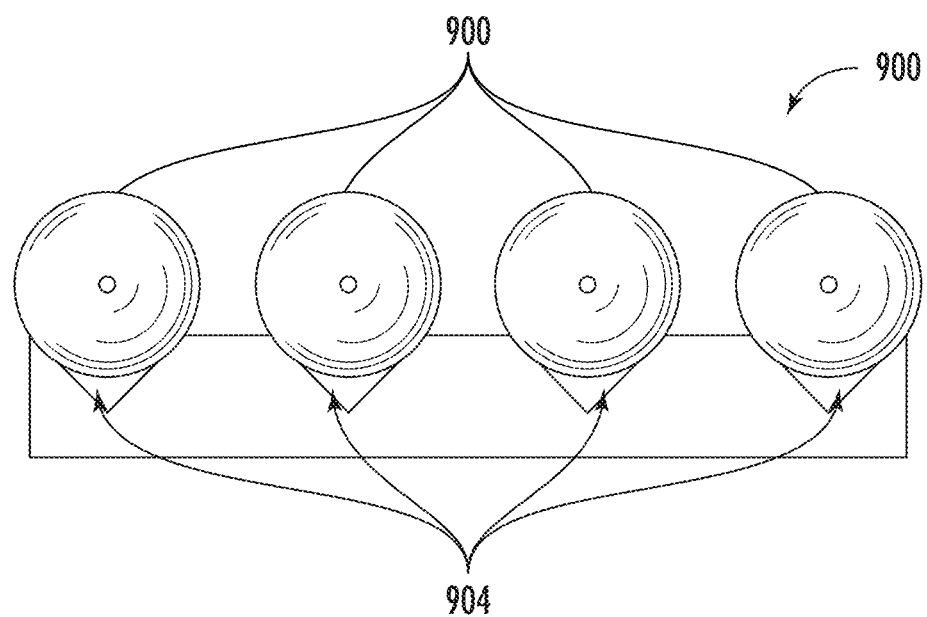
FIG. 9B is a close-up front view of the array of compact collimators of FIG. 9A.

FIGS. 9A-9B are views of an example array 900 of the collimators 800 of FIGS. 8A-8B. The collimators 800 are arranged side-by-side on a surface of a substrate 902, the substrate 902 including a plurality of grooves 904 (discussed above). The grooves 904 could be v-grooves or any other type of groove. A spacing between the substrate 902 of the side-by-side collimators 800 is greater than a spacing between the lenses 802 (see FIGS. 8A-8B) and fiber optic pigtails 804 (see FIGS. 8A-8B) of the side-by-side collimators 800.

Figure 10:
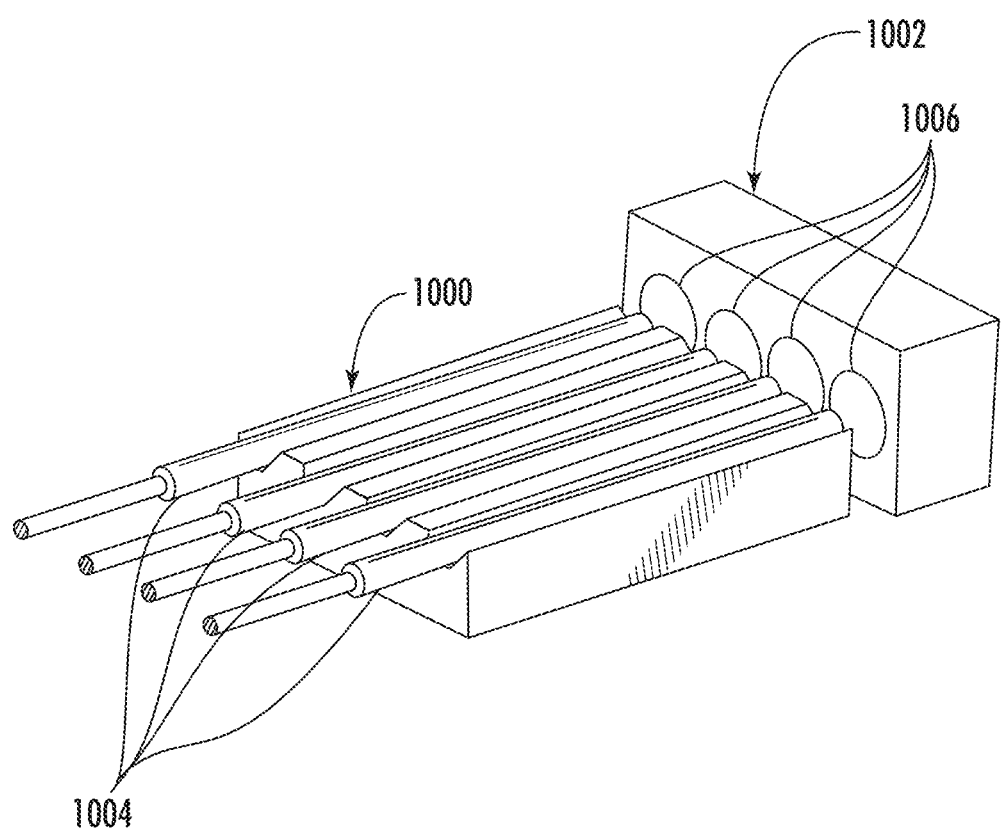
FIG. 10 is a perspective view of an example of a fiber array unit (FAU) for use with the components and devices of FIGS. 3A-5.

FIG. 10 is a perspective view of an example of a fiber array unit (FAU) 1000 and multi-lens array (MLA) 1002 for use with the components and devices of FIGS. 3A-5. More specifically, the FAU 1000 includes a plurality of fibers 1004, and the MLA 1002 includes a plurality of lenses 1006. The FAU 1000 and MLA 1002 can be used with any of the embodiments discussed above.

It will be apparent to those skilled in the art that various modifications and variations can be made without departing from the spirit or scope of the invention.

Further, as used herein, it is intended that terms "fiber optic cables" and/or "optical fibers" include all types of single mode and multi-mode light waveguides, including one or more optical fibers that may be glass core, plastic core, uncoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A method of using a wavelength-division multiplexing (WDM) device, comprising:

transmitting from a common collimator a multiplexed signal comprising a first signal, a second signal, a third signal, a fourth signal, and a fifth signal;

intersecting the multiplexed signal at a first angle of incidence (AOI) at a first WDM filter;

passing the first signal through the first WDM filter to a first channel collimator so that the multiplexed signal becomes a first remaining multiplexed signal;

reflecting the first remaining multiplexed signal from the first WDM filter to a second WDM filter;

intersecting the first remaining multiplexed signal at a second AOI at the second WDM filter;

passing the second signal through the second WDM filter to a second channel collimator so that the first remaining multiplexed signal becomes a second remaining multiplexed signal;

reflecting the second remaining multiplexed signal from the second WDM filter to a third WDM filter;

intersecting the second remaining multiplexed signal at a third AOI at the third WDM filter;

passing the third signal through the third WDM filter to a third channel collimator so that the second remaining multiplexed signal becomes a third remaining multiplexed signal that comprises the fourth signal and the fifth signal;

reflecting the third remaining multiplexed signal from the third WDM filter to a fourth WDM filter;

intersecting the third remaining multiplexed signal at a fourth AOI at the fourth WDM filter;

passing the fourth signal through the fourth WDM filter to a fourth channel collimator;

reflecting the fifth multiplexed signal from the fourth WDM filter to a fifth WDM filter that is configured to pass the fifth signal;

passing the fifth signal through the fifth WDM filter to a fifth channel collimator;

wherein the first WDM filter and the third WDM filter are aligned along a first axis;

wherein the second WDM filter and the fourth WDM filter are aligned along a second axis that is parallel to and offset from the first axis;

wherein the fourth AOI is different than the third AOI; and wherein the fifth WDM filter is positioned between the first axis and the second axis such that the optical signal path between the fourth WDM filter and the fifth WDM filter is smaller than the optical signal path between the first WDM filter and the second WDM filter.

2. A wavelength-division multiplexing (WDM) device, comprising:
a common port for optical communication of a multiplexed signal;
a first channel port for optical communication of a first signal of the multiplexed signal;
a second channel port for optical communication of a second signal of the multiplexed signal;
a third channel port for optical communication of a third signal of the multiplexed signal;
a fourth channel port for optical communication of a fourth signal of the multiplexed signal;
a fifth channel port for optical communication of a fifth signal of the multiplexed signal;
an optical signal path between the common port, the first channel port, the second channel port, the third channel port, and the fourth channel port;
a first WDM filter configured to pass the first signal and to reflect the second signal, the third signal, and the fourth signal, the optical signal path intersecting the first WDM filter at a first angle of incidence (AOI);
a second WDM filter configured to pass the second signal and reflect the third signal and the fourth signal, the optical signal path intersecting the second WDM filter at a second AOI;
a third WDM filter configured to pass the third signal and to reflect the fourth signal, the optical signal path intersecting the third WDM filter at a third AOI;
a fourth WDM filter configured to pass the fourth signal, the optical signal path intersecting the fourth WDM filter at a fourth AOI;
a fifth WDM filter configured to pass the fifth signal, the optical signal path intersecting the fifth WDM filter at a fifth AOI;
wherein the first WDM filter and the third WDM filter are aligned along a first axis;
wherein the second WDM filter and the fourth WDM filter are aligned along a second axis that is parallel to and offset from the first axis; and
wherein the fifth WDM filter is positioned between the first axis and the second axis such that the optical signal path between the fourth WDM filter and the fifth WDM filter is smaller than the optical signal path between the first WDM filter and the second WDM filter.

3. The WDM device of claim 2, wherein the fourth AOI is different than the third AOI, and wherein the fifth AOI is equal to the fourth AOI.

4. The WDM device of claim 3, wherein a filtering surface of the fifth WDM filter and a filtering surface of the fourth WDM filter are parallel.

5. The WDM device of claim 3, wherein the multiplexed signal further comprises a sixth signal and wherein the WDM device further comprises:
a sixth channel port for optical communication of a sixth signal of the multiplexed signal; and
a sixth WDM filter configured to pass the sixth signal, the optical signal path intersecting the sixth WDM filter at a sixth AOI;
wherein the sixth AOI is different than the fifth AOI.

6. The WDM device of claim 5, wherein the sixth AOI is larger than the fifth AOI.

7. The WDM device of claim 5, wherein a filtering surface of the sixth WDM filter and a filtering surface of the fifth WDM filter are non-parallel.

8. The WDM device of claim 5, wherein the optical signal path between the fifth WDM filter and the sixth WDM filter is smaller than the optical signal path between the first WDM filter and the second WDM filter.

9. The WDM device of claim 5, wherein the multiplexed signal further comprises a seventh signal and wherein the WDM device further comprises:
a seventh channel port for optical communication of a seventh signal of the multiplexed signal; and
a seventh WDM filter configured to pass the seventh signal, the optical signal path intersecting the seventh WDM filter at a seventh AOI;
wherein the seventh AOI is equal to the sixth AOI.

10. The WDM device of claim 9, wherein a filtering surface of the seventh WDM filter and a filtering surface of the sixth WDM filter are parallel.

11. The WDM device of claim 9, wherein the optical signal path between the sixth WDM filter and the seventh WDM filter is smaller than the optical signal path between the first WDM filter and the second WDM filter.

12. The WDM device of claim 9, wherein:
the second WDM filter, the fourth WDM filter, and the sixth WDM filter are aligned; and
the third WDM filter, the fifth WDM filter, and the seventh WDM filter are not aligned.

13. The WDM device of claim 2, wherein the first AOI is equal to the second AOI and the third AOI, and wherein the fourth AOI is larger than the third AOI.

14. The WDM device of claim 2, wherein:
a filtering surface of the first WDM filter, a filtering surface of the second WDM filter, and a filtering surface of the third WDM filter are parallel; and
a filtering surface of the fourth WDM filter and the filtering surface of the third WDM filter are non-parallel.

* * * * *